(12) United States Patent
Kowalick (10) Patent No.: US 7,107,245 B1
(45) Date of Patent: Sep. 12, 2006

(54) BIOMETRIC GAMING ACCESS SYSTEM

(75) Inventor: Gregory Kowalick, Langhorne, PA (US)

(73) Assignee: Gaming System Technologies, LLC, Las Vegas, NV (US)

( * ) Notice: Subject to any disclaimer, the term of this patent is extended or adjusted under 35 U.S.C. 154(b) by 0 days.

(21) Appl. No.: 09/552,887

(22) Filed: Apr. 20, 2000

(51) Int. Cl.
*G06Q 40/00* (2006.01)

(52) U.S. Cl. .................. 705/44; 705/39; 713/182; 713/184; 713/186; 235/380; 382/115

(58) Field of Classification Search ............... 235/382, 235/380, 379; 705/39, 44, 37, 36, 35, 5; 304/5.61, 10.41, 5.75; 380/25; 382/115, 382/124; 713/186, 172, 182, 184; G01S 5/18
See application file for complete search history.

(56) References Cited

U.S. PATENT DOCUMENTS

| | | | |
|---|---|---|---|
| 4,975,969 A | 12/1990 | Tal | 382/2 |
| 5,229,764 A | 7/1993 | Matchett et al. | 340/825.34 |
| 5,335,288 A | 8/1994 | Faulkner | 382/4 |
| 5,457,747 A | 10/1995 | Drexler et al. | 380/24 |
| 5,613,012 A * | 3/1997 | Hoffman et al. | 382/115 |
| 5,642,431 A | 6/1997 | Poggio et al. | 382/118 |
| 5,764,789 A | 6/1998 | Pare, Jr. et al. | 382/115 |
| 5,805,719 A | 9/1998 | Pare, Jr. et al. | 382/115 |
| 5,832,464 A | 11/1998 | Houvener et al. | 705/45 |
| 5,838,812 A | 11/1998 | Pare, Jr. et al. | 382/115 |
| 5,960,085 A * | 9/1999 | de la Huerga | 340/5.61 |
| 6,012,039 A | 1/2000 | Hoffman et al. | 705/14 |
| 6,016,476 A | 1/2000 | Maes et al. | |
| 6,023,688 A | 2/2000 | Ramachandran et al. | 705/44 |
| 6,038,334 A | 3/2000 | Hamid | |
| 6,092,192 A * | 7/2000 | Kanevsky et al. | 713/186 |
| 6,119,096 A * | 9/2000 | Mann et al. | 705/5 |
| 6,307,956 B1 * | 10/2001 | Black | 382/124 |

FOREIGN PATENT DOCUMENTS

| | | | |
|---|---|---|---|
| WO | WO 97/15032 | * | 4/1997 |
| WO | WO 99/64887 | * | 12/1999 |

OTHER PUBLICATIONS

IBM Technical Disclosure Bulletin "Personal Computer Environmental Control Via a Proximity Sensor", 1993 (3 pages).*
pincity.com, Mar. 3, 2000, webpage (toatl of 10 pages), http://web.archive.org/web/*/http://www.pincity.com.*

* cited by examiner

*Primary Examiner*—Hyung Sough
*Assistant Examiner*—Harish T. Dass
(74) *Attorney, Agent, or Firm*—Caesar, Rivise, Bernstein, Cohen & Pokotilow, Ltd.

(57) ABSTRACT

A method for cashless and tokenless access to casino machines is provided including the steps of providing a biometric registration apparatus connected to a computer having an input for a user to input a biometric sample and a payment input. The player registers including the steps of inputting a biometric sample into the biometric input and inputting money. The money is input into a unique player's account in the central computer associated with the biometric sample of the player. The player is identified at a gaming machine by the entering of a biometric sample and comparing it to the unique biometric data stored in the central computer. The player is then authorized to play and his account is credited or debited based on the player's wins and losses. The player is then paid any money remaining in his account after the player no longer desires to play by entering a biometric sample to access his account.

29 Claims, 4 Drawing Sheets

BIOMETRIC GAMING ACCESS SYSTEM

BACKGROUND OF THE INVENTION

This invention relates generally to casino gaming and, more particularly, to an improved system for operating cashless and tokenless gaming apparatus using an account accessed solely by a biometric sample.

Various means to use biometric samples are known, including use of fingerprints, hand prints, voice prints, retinal images, handwritten samples, and the like. Presently, most biometric data are stored on a token in electronic form, such as on a smart card or the like. Thus, the biometric data for a particular individual can be fraudulently copied and reproduced, for example, if a card is lost or stolen.

A tokenless biometric ATM access system is disclosed in U.S. Pat. No. 5,764,789 wherein a customer registers with a computer system. Here, the customer registers a personal identification number (PIN), one or more biometric samples, and one or more financial accounts. The customer initiates account access at an ATM or other financial device by entering the customer's personal authentication information which includes a PIN and a biometric sample. The personal authentication information is compared with the registration biometric sample to produce a successful or failed identification of the customer. If there is a successful identification of the customer, the customer is allowed to access the account.

This system positively identifies a person's identity to that person's specific account or accounts. In any typical bank or other financial account where a user has access to ATM machines, essential to the transaction is the relating of numerous details concerning the particular person to a particular account where that person is known to the bank or financial institution by address, social security number, birth date, and the like. The present system is not necessarily concerned with a person's details of his identity, such as social security number and the like. The present system is concerned with relay a only a particular biometric sample to a financial account. The person need not be identified further. Thus, effectively, the account is held in the level of the biometric sample, rather than in the name of the person. This allows for a certain level of anonymity that numerous gaming patrons deem to be of great importance. Thus, this system may be more similar to a system that uses currency. Of course, on the other hand, if deriserd, the present system allows a gaming organization to keep detailed records of the details of specific gaming patrons and groups of gaming patrons. Obviously, if desired, an alternate embodiment of the present system would give the gaming organization the ability to tie a particular biometric sample to a particular gaming patron and track that patron's activity within the system.

Finally, U.S. Pat. No. 6,012,039 (Hoffman et al.) discloses a tokenless biometric electronic rewards system where a recipient registers a biometric sample. The system authorizes reward transactions and the debiting and crediting of reward units from a reward recipient's electronic account, either at the retail point of sale or over the internet. The rewards recipient is not required to directly use any man-made personalized token in order to effect the transaction.

OBJECTS OF THE INVENTION

Accordingly, it is a general object of the present invention to provide a biometric gaming access system.

It is a further object of the present invention to provide a biometric gaming access system that provides for play at casino games without the need to carry currency or tokens during play.

It is still a further object of the present invention to provide a biometric gaming access system that utilizes a central account opened solely with a biometric sample and an amount of money, where a plurality of gaming apparatus may be played utilizing the central account with access obtained by the biometric sample.

It is still a further object of the present invention to provide a biometric gaming access system that utilizes an account accessed by a biometric sample of a fingerprint, hand print, voice print, retinal image, or the like, at a plurality of gaming apparatus.

It is still a further object of the present invention to provide a biometric gaming access system that utilizes an account accessed by a biometric sample and, optionally, a personal identification number (PIN).

It is yet another object of the present invention to provide a biometric gaming access system that utilizes an account accessed by a biometric sample at a plurality of gaming apparatus and gives account information on a display.

It is still another object of the present invention to provide a biometric gaming access system where a player does not have to be concerned with losing cash, a debit or credit card or a cash-out voucher.

It is a further object of this invention to provide a biometric gaming access system where a gaming organization can track players' use of various machines and amounts used by a particular player.

It is a still further object of the present invention to provide a biometric gaming access system that utilizes gaming apparatus that require less labor to maintain due to the apparatus not requiring to dispense cash or tokens.

It is a still further object of the present invention to provide a biometric gaming access system that reduces fraud.

It is a still further object of the present invention to provide a biometric gaming access system that does not require a token to be used that can be lost.

It is still a further object of the present invention to provide a biometric gaming access system that operates in a commercially acceptable time frame, for example, in less than five seconds.

SUMMARY OF THE INVENTION

These and other objects of this invention are achieved by providing a method for cashless and tokenless access to casino machines including the steps of providing a biometric registration apparatus connected to a computer having an input for a use to input a biometric sample and a payment input. The player registers including the steps of inputting a biometric sample into the biometric input and inputting money. The money is input into a unique player's account in the central computer associated with the biometric sample of the player. The player is identified at a gaming machine by the element of a biometric sample and comparing it to the unique biometric data stored in the central computer. The player is then authorized to play and this account is credited or debited based on the player's wins and losses. The player is then paid any money remaining in his account after the player no longer desires to play by entering a biometric sample to access his account. The account can be kept indefinitely for future play on a gaming machine within the system.

DESCRIPTION OF THE DRAWINGS

Other objects and many attendant features of this invention will become readily appreciated as the same becomes better understood by reference to the following detailed description when considered in connection with the accompanying drawings, wherein.

DETAILED DESCRIPTION OF THE PREFERRED EMBODIMENT

Figure 1:
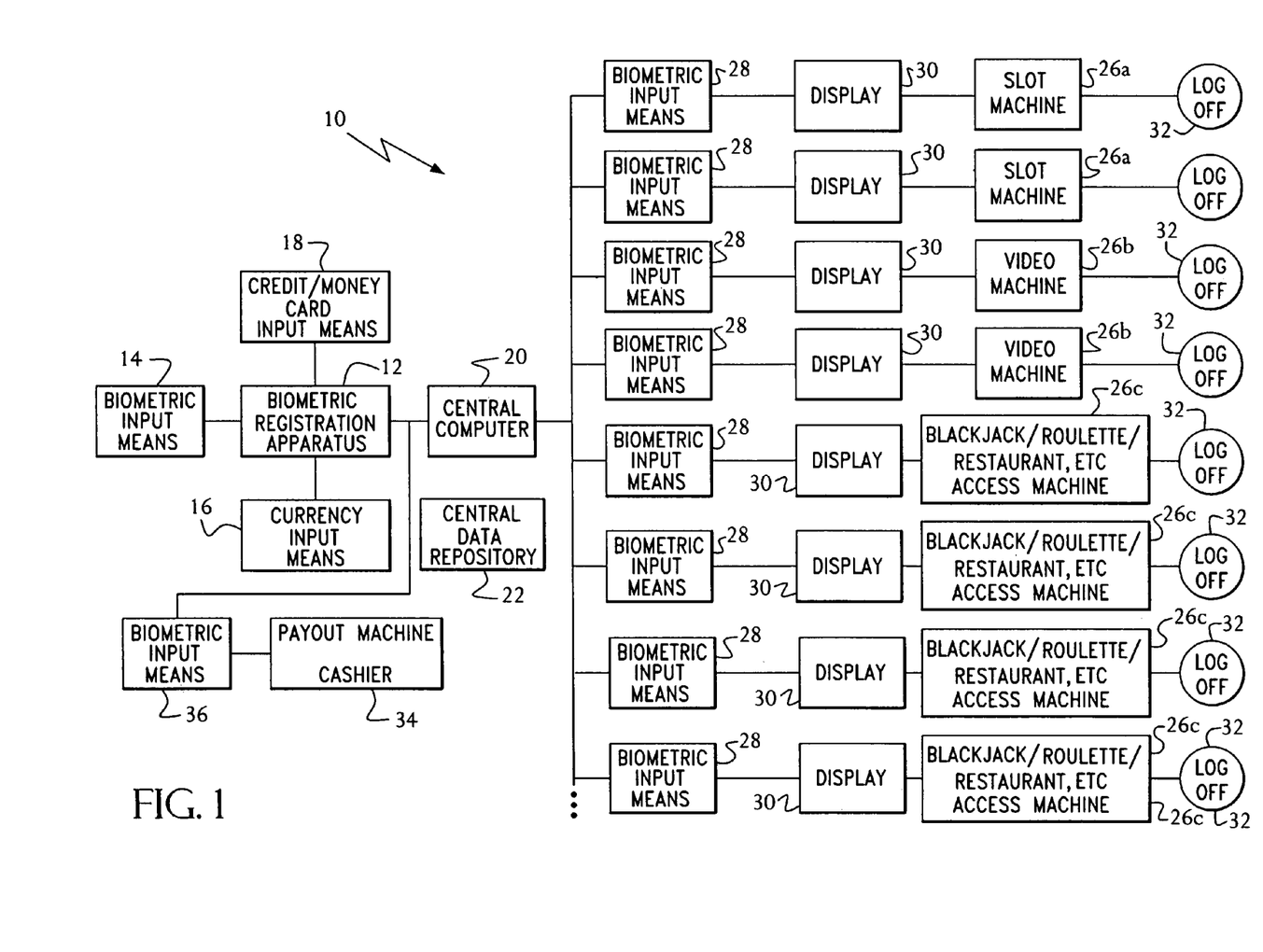
FIG. 1 is a schematic diagram of a biometric gaming access system in accordance with one preferred embodiment of the present invention.
Figure 2:
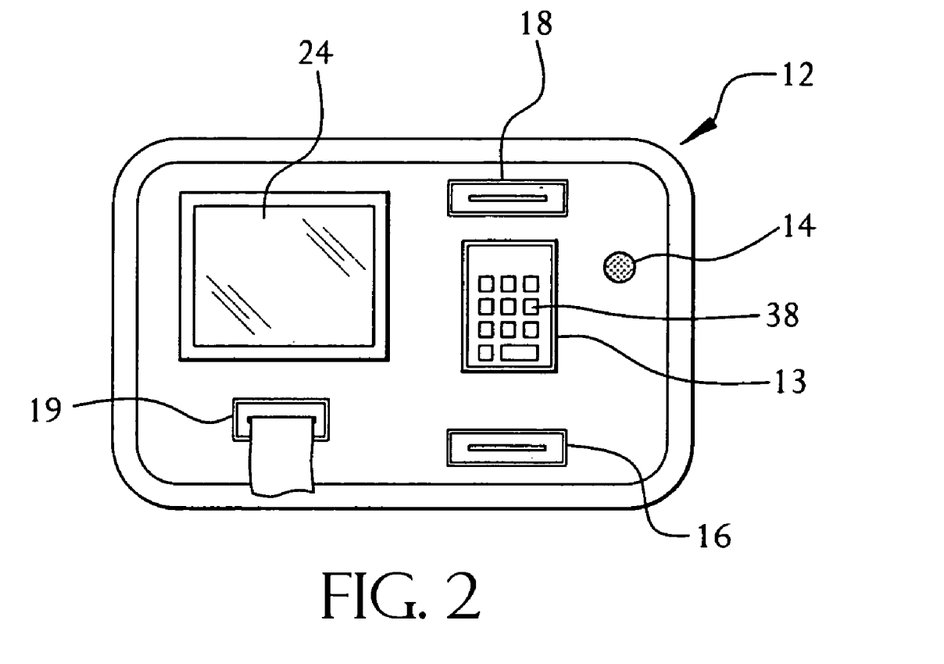
FIG. 2 is a simplified front elevation view of a biometric registration apparatus for use with the biometric gaming access system of FIG. 1.

Referring now to the drawings wherein like reference numbers refer to like parts throughout the several views, there is shown in FIG. 1 a schematic diagram of a biometric access system 10 in accordance with one preferred embodiment of the present invention. As can be seen in FIGS. 1 and 2, a player desiring to access various gaming apparatus, including slot machines, video machines, and the like, first registers at a biometric registration apparatus 12. There, the player provides an appropriate biometric to a biometric input means 14. For example, the biometric input means 14 could be based on one or more fingerprint, hand print, voice print, retinal image, or the like. Once the biometric registration apparatus 12 acknowledges acceptance of the biometric sample, a player then "cashes in", to the biometric registration apparatus 12 by providing a desired amount of currency to a currency input means 16 such as a bill validator as known in the art, or by providing a credit card, debit card, or other money access card to a card input means 18 as are known in the art. If the card input means 18 is used, the player authorizes an appropriate dollar amount, for example 50 or 100 dollars on an input device 13 (see FIG. 2) on the biometric registration apparatus 12. Based on this information the biometric registration apparatus 12 creates a unique player's account where account information is stored on a central computer 20 connected to the biometric registration apparatus 12. The computer 20 has a central data repository 22 containing unique players' accounts for all players on the system. This computer 20 may be a personal computer, main frame computer, or any other computer that meets the requirements of the present invention. The biometric registration apparatus 12 may optionally provide a paper receipt via a receipt slot 19 and/or provide a display 24 indicating the unique player's account information (see FIG. 2).

Figure 3:
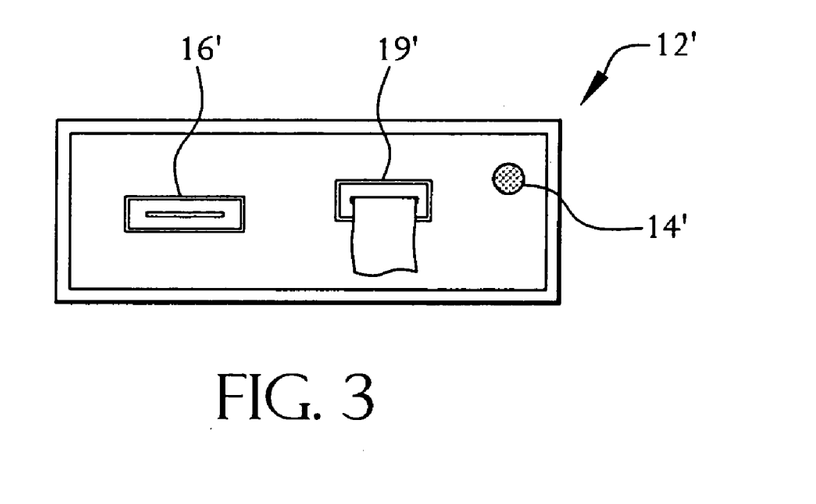
FIG. 3 is a simplified front elevation view of an alternate biometric registration apparatus for use with the biometric gaming access system of FIG. 1.

FIG. 2 depicts a simplified biometric region apparatus 12 which includes a biometric input means 14, a currency input means 16 in the form of a bill validator, a card reader 18, a display 24 and keypad 38 on an input device 13, and a receipt slot 19. FIG. 3 depicts a simplified biometric registration apparatus 12' that only has a biometric input means 14', a bill validator 16' and a receipt slot 19'.

It must be noted here that the registration process only requires input of a biometric and input of money in some form. No personal data beyond the biometric is required, thereby providing at least some level of anonymity to the player. However, optionally, additional personal information can be requested or required. A gaming organization may desire to collect information concerning its patrons. Obtaining this information by a biometric as indicated above can be accomplished quickly and nonintrusively.

Figure 4:
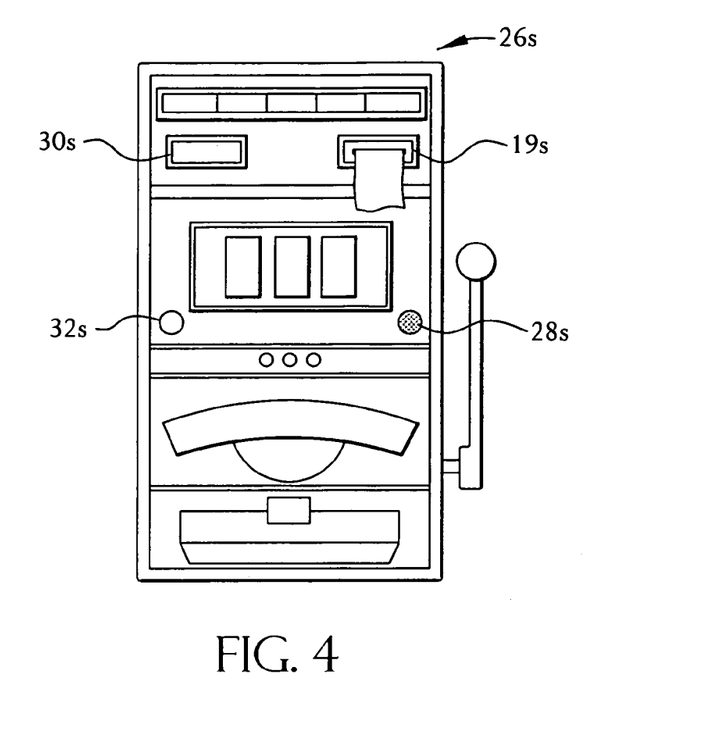
FIG. 4 is a simplified front view of a slot machine for use with the biometric gaming access system of FIG. 1.
Figure 5:
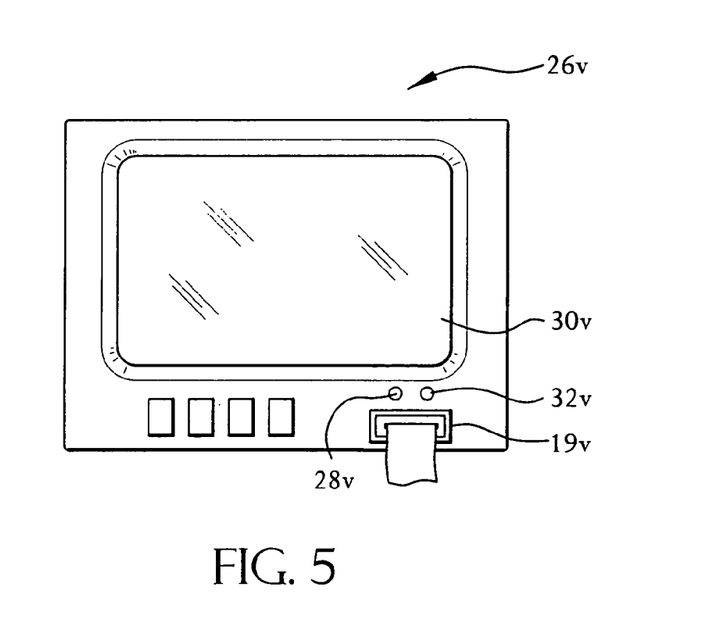
FIG. 5 is a simplified front view of a video gaming machine having a touch screen for use with the biometric gaming access system of FIG. 1.

Once a player has successfully registered onto the system by providing the biometric sample and money, the player then may proceed to any slot machine 26a, video machine 26b, or other access machine 26c in the system and begin play. When the player selects the desired machine that is equipped with the required apparatus as described herein, he provides the appropriate biometric to a biometric input means 28 for which the machine is capable of reading, for example, a fingerprint. See, for example, FIG. 4 which depicts a slot machine 26s, a thumbprint scanner as biometric input means 28s, a display 30s, a logoff button 32s and a receipt slot 19s. Likewise, see, for example, FIG. 5 which depicts a video gaming machine 26v, a thumbprint scanner as biometric input means 28v, a display 30v which is incorporated in the gaming machine's touch screen, a logoff button 32v, and a receipt slot 19v. The desired machine will then communicate back to the central computer 20 to obtain account information based on that biometric sample. Preferably, a display 30 on the machine will then indicate the account balance. Additional information may be provided on the display if that information is available. For example, the display, may indicate "Good Morning Mr. Smith. You have $255.00 in your account." The player then begins play with his account balance increasing or decreasing according to the players wins and losses.

Once the player decides to cease playing on the particular machine, that player logs off the machine by pressing a logoff means 32 such as a button, or if the machine has a proximity sensor logoff as described below, the machine would log off automatically when the player leaves. The player could then move to another slot machine 26a, video machine 26b or other access machine 26c on the system, provide the appropriate biometric sample and again begin play. Once a player is finished all play and desires to "cash out," the player then proceeds to a payout machine or a cashier 34 (or he may cash out a specific machine as described below). There, again, the player provides the appropriate biometric sample to a biometric input means 36, and receives the balance of the money in his unique player's account. Typically, the player would only be required to register once, so long as a balance remains in the player's unique player's account.

Additionally, a biometric registration apparatus 12, including associated biometric input means 14, and card input means 18 anchor currency input means can be incorporated into all or a plurality of gaming machines 26a, 26b, 26c, etc. This could eliminate a need for a separate biometric registration apparatus kiosk. For example a gaming patron could enter a casino, insert money and a thumbprint to a slot machine to create an account. That player could play that machine, then logoff and move to another machine and log on by applying his thumbprint to the new machine. As long as the player's account does not drop to zero, he can continue moving from machine to machine in this manner. Additionally, one or more gaming machines may optionally have the ability to payout a part or all of that player's account, assuming that player properly logs onto the machine with his thumb.

Figure 6:
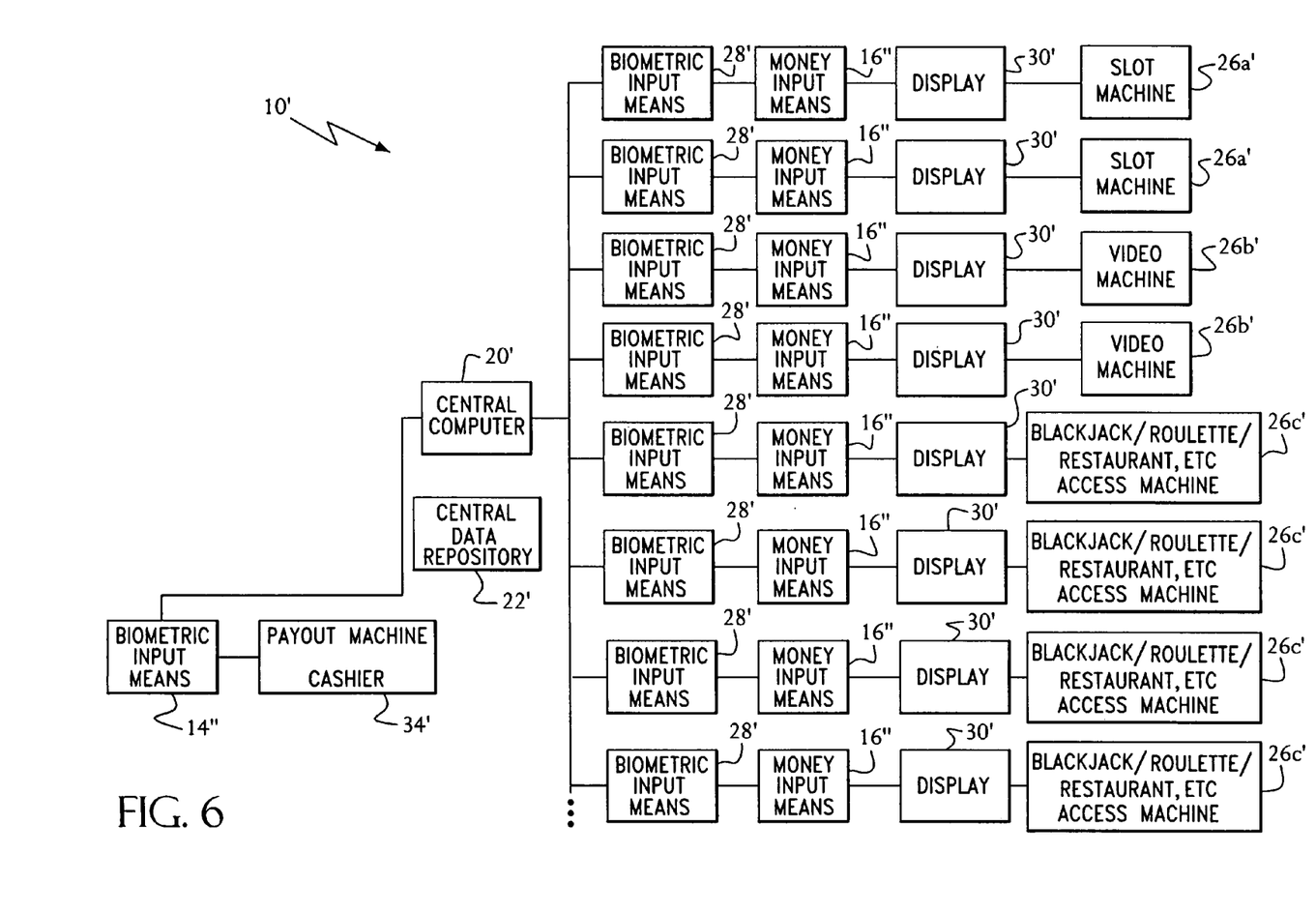
FIG. 6 is a schematic diagram of a biometric gaming access system in accordance with a second preferred embodiment of the present invention.

In an alternate embodiment of the present invention, as depicted schematically in FIG. 6, a modified version of the system 10' is shown. Here, a separate initial registration step is not required. In this system, a gaming platter can merely start playing a gaming machine such as a slot machine 26a', video machine 26b', or generic machine 26c' in a conventional manner using, for example money or a card. The player can collect his winnings in a conventional manner, by collecting his winning at the machine or using a voucher issued by the machine. However, here, rather than collecting his winnings, the player may now provide an appropriate biometric sample to a biometric input means 28' on the machine 26a', 26b', 26c'. A central computer 20' would then create an account which relates the biometric sample to the balance in the account. The player could then move to another machine within the system and insert that same biometric sample into the machine. The machine would access the account associated with that biometric sample and allow the account to be credited or debited as appropriate. Whenever that player wishes to close the account, he can either have the machine pay out, or move to a separate payout machine or cashier 34', again provide the appropriate biometric sample to a biometric input means 14" on the machine to access his account, and obtain his account balance. Again, a display 30' may be provided. The primary difference in the embodiment of FIG. 6 and the embodiment of FIG. 1 is that no initial registration step is required prior to play. In this manner, a player does not have to decide until after he is finished playing each. Same as to whether or not he wishes to obtain the balance in the machine. A player can also play several machines by inserting an amount of money in each. As he leaves each machine the player would then optionally collect the money remaining/winnings at the machine or insert the appropriate biometric sample, building his account each time he leaves a machine, if there is any money remaining in the account.

Additional security measures can optionally be used in addition to providing the biometric sample. For example, during both the registration process and during access to the various gaming machines, a player may be required to provide additional personal information, including a PIN number, social security number, address, or the like to, for example, a key pad 38.

Ideally, most or all of the major manufacturers of gaming machines would manufacture machines that utilize the present system and all would be connected back to the central computer, within a particular system. A player is able to move from gaming machine to gaming machine by merely providing the appropriate biometric sample, without having to use debit cards or cash-out slips, or the like. When a player moves from one machine to another, his account would automatically be credited or debited through the central computer 20. Therefore, a player can freely move form machine to machine keeping a single account. As indicated above, once a player is finished play on a particular gaming machine, that player would log off the machine to prevent another from playing on his account. Here, numerous means to reduce fraud may be utilized. For example, the system may be set up to allow for only one player to play on a single account such that if that player moves to a second machine without logging off the first machine would automatically log off. In any event, since the unique player's account may only be accessed by one player, only that player could ultimately collect any account balance since the biometric sample is required to be presented for payment. Another possible way to reduce fraud associated with the present system would be to include a proximity sensor for logging off, as known, for example for plumbing in some public restrooms, that automatically logs a user or player off the machine when that user walks away from that machine.

The system may also be used for other related monetary transactions. For example, a biometric input means with associated access machine might be placed at kiosks in various other locations around a casino or hotel. Such an apparatus might be placed at a restaurant such that a player can deduct a dinner bill from his balance. Likewise, in any other facility within the hotel that requires payment of money, including spas, fitness clubs, cocktail lounges, shops, sports facilities, theaters, and the like, may use the biometric gaming access system 10 of the present invention. Special generic biometric gaming access machines can be provided that allow such transactions or gaming play (for example blackjack or roulette) from a unique user's account. Here, the user would register at the biometric registration apparatus and then register at the generic biometric access machine. The dealer or other person then would credit or debit the count accordingly.

Additionally, the system may be used on a more widespread network. For example, the central computer may extend to other hotels or casinos within a particular area, or even nationally or internationally. The system could likewise extend beyond the gaming industry where the private account and security of the present system is desired, but the privacy associated with this system, which as indicated above, only requires a biometric to open an account and not necessarily a name, address, social security number, or the like. No further information is required.

Another possible application is for use of the present system by a movie or other type of theater. Here, a player could register in the same manner as described above with respect to gaming. A player would provide the appropriate biometric any time he wished to enter the movie theater. His unique account would be adjusted accordingly. Of course, this application could be applied to substantially any retail establishment.

An obvious benefit to the present system is that players would not be required to carry around large amounts of money or credit/debit cards after the initial buy-in, particularly coins, that might be heavy and burdensome. Gaming facilities around pools or beaches would greatly benefit.

If the gaming organization or other organization using this device desires to use the device to track usage, the gaming organization could provide additional benefits to the player based on that player's known usage. For example, a player might receive bonus play for playing the gaming machines for a particular period of time. Additionally, usage tracking may be used to determine which machines are more popular with certain demographic groups, by requesting that additional identifiers be supplied during the registration process. Promotional activities could also be better targeted based on information obtained.

Another advantage of the present system is that, ultimately, the machines require less labor to service since, if no actual money was inserted or dispensed, there would be fewer moving parts, no coin bins to empty or fill, and the like.

As indicated above, use of the present invention would also substantially decrease baud since accounts are kept, transactions are recorded, and there are no credit cards, vouchers, or other tokens that are used after registration that may be stolen. It is unlikely that a player would attempt to use another's credit card during the registration process, since a biometric such as a fingerprint must be provided.

The gaming organization would benefit because the amount of play per machine, per hour, will likely increase because the player is buying in only once and does not have to buy in at each machine they play. Additionally, the gaming machines would not have down time caused by the requirement to fill and refill hoppers.

Finally, another unique application of the present invention is that, based on the player tracking information obtained, other unique games may be devised. For example, a feature that may be added to the gaming device is an instant winner game. In this example, the central computer of the present invention may be programmed to randomly select a biometric registered in its system within the last hour, day, week, or the like. When a player registers and moves from machine to machine, if the biometric matches the biometric that the central computer has randomly selected, that player becomes an instant winner of a prize.

Without further elaboration, the foregoing will so fully illustrate our invention that others may, by applying current or future knowledge, readily adopt the same for use under various conditions of service.

I claim:

1. A method for cashless and tokenless access to a plurality of casino gaming apparatus, said method comprising the steps of:
    (a) providing a tokenless biometric registration apparatus having at least one registration biometric input means for a player to input a biometric sample, said biometric registration apparatus having at least one payment input means, said biometric registration apparatus connected to a central computer having a central data repository;
    (b) providing the plurality of gaming apparatus, each gaming apparatus connected to said central computer, each gaming apparatus having at least one gaming apparatus biometric input means and a player logoff means;
    (c) registering a player comprising the steps of inputting at least one biometric sample of the player into the registration biometric input means, storing unique biometric data created by the biometric input means in the central data repository but not associating the unique biometric data with other details of identity of the player, inputting into the payment input means an amount of money, creating a unique player's account in the central computer associated with the at least one biometric sample of the player and storing the amount of money input in the unique player's account;
    (d) identifying said player at one of said plurality of gaming apparatus by said player entering a gaming apparatus biometric sample input into said one of said plurality of gaming apparatus biometric input means and comparing said biometric sample input to said unique biometric data stored in said central data repository;
    (e) authorizing said player at said one of said plurality of gaming apparatus to play on said one of said plurality of gaming apparatus;
    (f) debiting and or crediting said unique player's account based on the player's wins and losses at the gaming apparatus until said player logs off using said player logoff means or until said player's account is exhausted; and
    (g) paying said player any money remaining in said player's account after said player no longer desires to play;
    whereby a player can move to another of the plurality of gaming apparatus, input a biometric sample into one of the at least one gaming apparatus biometric input means, play the gaming apparatus for a period of time, and log off the gaming apparatus, said unique player's account being credited and debited for wins and losses on the gaming apparatus.

2. A method for cashless and tokenless access to a plurality of casino gaming apparatus according to claim 1, wherein the step of providing the plurality of gaming apparatus with the player logoff means includes providing a player logoff proximity sensor.

3. A method for cashless and tokenless access to a plurality of casino gaming apparatus according to claim 1, wherein the step of providing the plurality of gaming apparatus with the player logoff means includes providing a player logoff button.

4. A method for cashless and tokenless access to a plurality of casino gaming apparatus according to claim 1, where the step of paying said player money remaining in said player's account includes providing a payout machine having a payout biometric input means.

5. A method for cashless and tokenless access to a plurality of casino gaming apparatus according to claim 4, where the step of providing the payout machine includes providing a payout machine that is integral to at least one of said casino gaming apparatus.

6. A method for cashless and tokenless access to a plurality of casino gaming apparatus according to claim 1, where the steps including providing the registration biometric input means and the gaming apparatus biometric input means that utilize fingerprints, hand prints, retina scans, or voice prints.

7. A method for cashless and tokenless access to a plurality of casino gaming apparatus according to claim 1, where the step including providing the payment input means includes providing a payment input means that accepts credit cards, debit cards, or money access cards.

8. A method for cashless and tokenless access to a plurality of casino gaming apparatus according to claim 1, where the step including providing the payment input means includes providing a payment input means that accepts currency.

9. A method for cashless and tokenless access to a plurality of casino gaming apparatus according to claim 1, where the step of providing the plurality of gaming apparatus includes providing slot machines and video gaming machines.

10. A method for cashless and tokenless access to a plurality of casino gaming apparatus according to claim 1, where the step of providing the plurality of gaming apparatus includes providing generic access machines.

11. A method for cashless and tokenless access to a plurality of casino gaming apparatus according to claim 1, further including the step of collecting player data related to players' use of said plurality of casino gaming apparatus to the central computer having the central data repository.

12. A method for cashless and tokenless access to a plurality of casino gaming apparatus according to claim 11, where the player data collected includes data concerning type of casino gaming apparatus, quantity of casino gaming apparatus played, time spent on each casino gaming apparatus, and money spent on each casino gaming apparatus.

13. A method for cashless and tokenless access to a plurality of casino gaming apparatus according to claim 1, including the step of providing a keypad on the biometric registration apparatus for using a PIN and wherein the step of registering a player includes entering a PIN.

14. A method for cashless and tokenless access to a plurality of casino gaming apparatus according to claim 1, wherein the step of providing the plurality of gaming apparatus includes providing gaming apparatus having a video screen for displaying information related to the player's unique player's account.

15. A method for cashless and tokenless access to a financial account, said method comprising the steps of:
   (a) providing a tokenless biometric registration apparatus having at least one registration biometric input means for a user to input a biometric sample, said biometric registration apparatus having at least one payment input means, said biometric registration apparatus connected to a central computer having a central data repository;
   (b) providing a plurality of kiosks, each kiosk connected to said central computer, each kiosk having at least one kiosk biometric input means;
   (c) registering a user comprising the steps of inputting at least one biometric sample of the user into the registration biometric input means, storing unique biometric data created by the biometric input means in the central data repository but not associating the unique biometric data with other details of identity of the user, inputting into the payment input means an amount of money, creating a unique user's account in the central computer associated with the at least one biometric sample of the user and storing the amount of money input in the unique user's account;
   (d) identifying said user at one of said plurality of kiosks by said user entering a kiosk biometric sample input into said one of said plurality of kiosk biometric input means and comparing said biometric sample input to said unique biometric data stored in said central data repository;
   (e) authorizing said user at said one of said plurality of kiosks to access said unique user's account for a transaction;
   (f) debiting and or crediting said unique user's account based on the transaction; and
   (g) paying said user any money remaining in said user's account, when said user desires to cancel said unique user's account.

16. A method for cashless and tokenless access to a financial account according to claim 15, where the steps including providing the registration biometric input means and the kiosk biometric input means that utilize fingerprints, hand prints, retina scans, or voice prints.

17. A method for cashless and tokenless access to a financial account according to claim 15, where the step including providing the payment input means includes providing a payment input means that accepts credit cards, debit cards, or money access cards.

18. A method for cashless and tokenless access to a financial account according to claim 15 where the step including providing the payment input means includes providing a payment input means that accepts currency.

19. A method for cashless and tokenless access to a financial account according to claim 15, including the step of purging the unique biometric data and the unique user's account from the central computer after the step of paying said user any money remaining in said user's account, to provide for privacy of the user.

20. A method for cashless and tokenless access to a financial account according to claim 15, including the step of providing a keypad on the biometric registration apparatus for using a PIN and wherein the step of registering a user includes entering a PIN.

21. A method for cashless and tokenless access to a financial account according to claim 15, wherein the step of providing the plurality of kiosks includes providing kiosks having a video screen for displaying information related to the user's unique user's account.

22. A method for cashless and tokenless access to a plurality of casino gaming apparatus, said method comprising the steps of:
   (a) providing the plurality of gaming apparatus, each gaming apparatus connected to a central computer having a central data repository, each gaming apparatus having at least one gaming apparatus biometric input means and a money input means;
   (b) allowing a player to play on any of said gaming apparatus by inputting money into said money input means;
   (c) after the player plays on a gaming apparatus, registering said player comprising the steps of inputting at least one biometric sample of the player into the gaming apparatus biometric input means, storing unique biometric data created by the biometric input means in the central data repository but not associating the unique biometric data with other details of identity of the player, creating a unique player's account in the central computer associated with the at least one biometric sample of the player, crediting to the unique player's account in the central computer an amount of money associated with the at least one biometric sample of the player;
   (d) allowing a player to play on another of said gaming apparatus by inputting money into said money input means or by accessing said unique player's account of said player by inputting said biometric sample of said player into the gaming apparatus biometric input means and comparing said biometric sample to said unique biometric data stored in said central data repository;
   (e) debiting and or crediting said unique player's account based on the player's wins and losses at said another gaming apparatus until said player logs off by exhausting his account, collecting his winnings, or until said player inputs the biometric sample of said player into said gaming apparatus biometric input means; and
   (f) comparing said biometric sample to said biometric data stored in said central data repository and crediting or debiting said unique player's account accordingly;
   whereby a player can move to another of the plurality of gaming apparatus, input a biometric sample into one of the at least one gaming apparatus biometric input means, play the gaming apparatus for a period of time, and log off the gaming apparatus, said unique player's account being credited and debited for wins and losses on the gaming apparatus.

23. A method for cashless and tokenless access to a plurality of casino gaming apparatus according to claim 22, where the step of paying said player money remaining in said player's account includes providing a payout machine having a payout biometric input means.

24. A method for cashless and tokenless access to a plurality of casino gaming apparatus according to claim 23, where the step of providing the payout machine includes providing a payout machine that is integral to at least one of said casino gaming apparatus.

25. A method for cashless and tokenless access to a plurality of casino gaming apparatus according to claim 22, where the steps including providing the gaming apparatus biometric input means that utilizes fingerprints, hand prints, retina scans, or voice prints.

26. A method for cashless and tokenless access to a plurality of casino gaming apparatus according to claim 22, where the step including providing the payment input means includes providing a payment input means that accepts credit cards, debit cards, or money access cards.

27. A method for cashless and tokenless access to a plurality of casino gaming apparatus according to claim 22, where the step including providing the payment input means includes providing a payment input means that accepts currency.

28. A method for cashless and tokenless access to a plurality of casino gaming apparatus according to claim 22, where the step of providing the plurality of gaming apparatus includes providing slot machines and video gaming machines.

29. A method for cashless and tokenless access to a plurality of casino gaming apparatus according to claim 22, where the step of providing the plurality of gaming apparatus includes providing generic access machines.

* * * * *